(12) United States Patent
Spindler (10) Patent No.: US 10,076,936 B2
(45) Date of Patent: Sep. 18, 2018

(54) PRESSURE RELIEF SIGNAL-BUTTON FOR TIRE REPAIR KIT

(71) Applicant: Martin P. Spindler, Herdwangen-Schönach (DE)

(72) Inventor: Martin P. Spindler, Herdwangen-Schönach (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 162 days.

(21) Appl. No.: 14/928,566

(22) Filed: Oct. 30, 2015

(65) Prior Publication Data
US 2016/0144673 A1    May 26, 2016

(30) Foreign Application Priority Data

Nov. 24, 2014    (DE) .......................... 10 2014 117 159

(51) Int. Cl.
| | |
|---|---|
| *B60C 23/02* | (2006.01) |
| *G01L 17/00* | (2006.01) |
| *B29C 73/16* | (2006.01) |
| *B29L 30/00* | (2006.01) |

(52) U.S. Cl.
CPC ............ *B60C 23/02* (2013.01); *B29C 73/166* (2013.01); *G01L 17/00* (2013.01); *B29L 2030/00* (2013.01)

(58) Field of Classification Search
CPC ...... G01L 17/00; B60C 23/02; B60C 23/0405
See application file for complete search history.

(56) References Cited

U.S. PATENT DOCUMENTS

| | | | |
|---|---|---|---|
| 1,495,599 A | 5/1924 | Konkowski | |
| 1,985,759 A * | 12/1934 | Baumgartner | .......... B60S 5/043 |
| | | | 137/224 |
| 3,074,457 A * | 1/1963 | Tubbs | ..................... B60S 5/043 |
| | | | 137/227 |
| 2002/0050164 A1* | 5/2002 | Wallach | .............. B60C 23/0496 |
| | | | 73/146.3 |
| 2011/0038738 A1 | 2/2011 | Kojima et al. | |
| 2014/0209207 A1 | 7/2014 | Spindler et al. | |

FOREIGN PATENT DOCUMENTS

| | | |
|---|---|---|
| DE | 10 2014 100 815 A1 | 7/2014 |
| EP | 2 275 679 A1 | 1/2011 |

* cited by examiner

*Primary Examiner* — David M Gray
*Assistant Examiner* — Andrew V Do
(74) *Attorney, Agent, or Firm* — Pauley Erickson & Kottis (57) ABSTRACT

A pressure indicator device for a flat tire repair kit for motor vehicles, in which the flat tire repair kit includes a compressor and a pressure outlet and the pressure indicator device (1.1-1.3) is an indicator for a pressure that the compressor of the flat tire repair kit produces in a tire that is being filled and includes a base body, a conduit (4.1-4.3), an optical element, an acoustic element, and a throttle (5.1-5.3); and the throttle (5.1-5.3) includes an adjustable throttle valve, wherein the conduit (4.1-4.3) is operationally connected to the optical element and the acoustic element; an air flow (L) through the conduit that the air pressure produces in the base body is deflected into a horizontal and/or an inclined horizontal direction, and an indicator element of the optical element can be moved in the horizontal and/or inclined horizontal direction.

20 Claims, 5 Drawing Sheets

PRESSURE RELIEF SIGNAL-BUTTON FOR TIRE REPAIR KIT

CROSS REFERENCE TO RELATED APPLICATION

German Patent Reference 10 2014 117 159.4, filed 24 Nov. 2014, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The invention relates to a pressure indicator device for a flat tire repair kit for motor vehicles according to the preamble to claim 1.

Description of Prior Art

A variety of flat tire repair kits for motor vehicles are known from the prior art. The flat tire repair kits are primarily used for dispensing tire sealants into defective tires and subsequently or simultaneously filling the tire with compressed air. For this purpose, the flat tire repair kits usually have a compressor, which is driven by a motor. In typical exemplary embodiments, a pressure that the compressor produces in the tire that is being filled is indicated by means of a manometer that is integrated into the flat tire repair kit. A flat tire repair kit of this kind is disclosed, for example, in DE 10 2014 100 815 A1.

Using a manometer as the pressure indicator device has the disadvantage that the user often fills the tire to a value that is not ideal. The causes for this can, for example, be ignorance of the ideal reference values as well as the carelessness that is produced by the stress of having a flat tire.

EP 2 275 679 A1 has disclosed another system that does not include a manometer. For this purpose, the system has an indicator device, which is composed of a plurality of individual parts and is pushed out from the housing of the system when a particular reference pressure is reached. This pressure indicator device is similar in function to the indicator on a pressure cooker. The disadvantage of this is that on the one hand, in most cases, only a certain reference pressure can be indicated, whereas a reference pressure range cannot be indicated or can only be indicated to a limited degree. There is also the risk of a user getting caught on the protruding component, which can cause injury to the user. This can also break the component, which would result in a malfunctioning of the system.

The object of the invention is to provide a pressure indicator device, which reliably provides the user with an indication of a reference pressure range that is as unmistakable as possible. Another object of the invention of the invention is to provide a pressure indicator device that is easy to produce and can be used for a number of reference pressure ranges. Another object of the invention of the invention is to provide a pressure indicator device, which can be replaced with another pressure indicator device as simply as possible. In addition, it should be possible to integrate a pressure indicator device according to the invention into the outside dimensions of the housing of the flat tire repair kit.

SUMMARY OF THE INVENTION

The object is attained by means of the features according to claim 1.

In a typical exemplary embodiment, a pressure indicator device according to the invention is used in a flat tire repair kit for motor vehicles. A flat tire repair kit of this kind includes at least one compressor and a pressure outlet. By means of the pressure outlet, a tire can be filled with compressed air, with the compressed air being produced by the compressor.

In a typical exemplary embodiment, the pressure indicator device is an indicator that shows the user of the flat tire repair kit the pressure that the compressor produces in a tire that is being filled. The pressure indicator device includes at least one base body, a conduit, an optical element, an acoustic element, and a throttle. In a typical exemplary embodiment, the throttle includes an adjustable throttle valve.

The conduit of the pressure indicator device according to the invention is operationally connected to the pressure outlet of the flat tire repair kit as well as to the optical element and the acoustic element. In addition, the conduit deflects a flow of air in the base body into a horizontal and/or an inclined horizontal direction. The term "horizontal" is used here and in the following to mean a plane and/or direction that is essentially parallel to the plane of the ground or to a road surface. The air flow in the conduit is produced by the air pressure that the compressor of the flat tire repair kit provides at the pressure outlet in order to fill the tire.

In addition, in a pressure indicator device according to the invention, an indicator element of the optical element can be moved in the vertical direction and/or in an inclined vertical direction. In a typical exemplary embodiment, the indicator element is moved by the air pressure that is deflected into the vertical direction and/or an inclined vertical direction. In a typical exemplary embodiment, the indicator element of the optical element is a ball or a slider, which is moved by means of at least a part of the deflected air flow.

In a typical exemplary embodiment, the indicator element is contained in a cavity, which is formed by the base body and a base body cover.

In one exemplary embodiment, the cavity is a tube whose shape corresponds to an outer shape of the slider. The tube in which the slider is supported in movable, preferably sliding fashion is operationally connected to the conduit of the base body. The conduit deflects the air flow into the horizontal direction and into the tube, which likewise extends in an essentially horizontal direction. Preferably, the tube and the slider have a curvature so that the air flow in the tube causes the slider to move on a circular path.

In another embodiment, the cavity is embodied in a funnel shape between the base body and the base body cover. In this case, the cavity can, for example, be embodied in the shape of a parabolic funnel or a stepped parabolic funnel. The funnel-shaped cavity preferably contains a ball. The conduit is operationally connected to the cavity and deflects the air flow into a preferably inclined horizontal direction into the cavity. The air flow pushes the ball outward in the funnel-shaped cavity. The distance that the ball is pushed outward depends on the intensity of the air flow and this intensity depends on the air pressure at the pressure outlet of the flat tire repair kit.

In a typical exemplary embodiment, the optical element of the pressure indicator device includes a color scale in addition to the indicator element. The color scale, which is preferably divided into three indicator regions, indicates reference pressure ranges.

In a typical exemplary embodiment, one indicator region indicates an optimal reference pressure range. The reference pressure range that the indicator region should indicate as optimal can be adjusted by means of the throttle. This indicator region is preferably green in color. In addition, another of the indicator regions preferably indicates a reference pressure range, which tells the user that the air pressure in the tire is too high. This indicator region is preferably red in color. The third indicator region can indicate both an excessively low reference pressure range and a reference pressure range that shows the user a transition range between the optimal reference pressure range and the excessively high reference pressure range.

The color scale is preferably attached to and/or integrated into the slider or the base body cover. When a ball is provided as an indicator element, preferably a color scale is used, which is integrated into the base body cover or attached to it in the form of a film that has a sufficient degree of transparency. As a result, a ball that is white, for example, appears to the user to be green or red as soon as the air flow has deflected the white ball under the green transparent region or the red transparent region.

With regard to the color scale and the coverage of a reference pressure range by the individual indicator regions, it is particularly advantageous if the same indicator is used to reliably cover a different optimal pressure for front and rear tires, for example. In addition, the user can read the achievement of the optimal pressure range on a pressure indicator device according to the invention considerably better than on manometers or indicators from the prior art that function using the same principle as an indicator on a pressure cooker.

In a typical exemplary embodiment, the acoustic element of the pressure indicator device is a sound generator with a resonance chamber. Preferably, the sound generator is an acoustic whistle, which is operationally connected to the conduit of the base body. For this purpose, the base body preferably has a socket for the acoustic element, which is in turn connected to the conduit. The acoustic element and the socket for the acoustic element are preferably embodied so that the acoustic element can be easily replaced. For example, the sound generator can include an external thread that corresponds to an internal thread in the socket or a simple plug connection is provided.

A frequency and tone color of a sound produced by the acoustic element depend on the size and shape of the resonance chamber. But the frequency and tone color also depend on the sharpness of a cutting edge and on an angle, a thickness, and an intensity of the air flow that enters the resonance chamber and/or strikes the cutting edge of the acoustic element.

The acoustic element is preferably adapted to the optimal reference pressure range so that it notifies the user that the reference pressure range has been reached by producing a whistling sound or the like. Thus in addition to being notified by the optical indicator that the reference pressure has been reached, the user is also given an acoustic signal. In an exemplary embodiment, the whistling sound becomes a sound that is generally unpleasant to the human ear as soon as the optimal reference pressure range is exceeded.

In a typical exemplary embodiment, the pressure indicator device should be easily replaceable. To this end, the pressure indicator device preferably has a connector that corresponds to a socket of the flat tire repair kit.

It is thus possible for various embodiments of the pressure indicator device to be universally used in flat tire repair kits or also, if so desired by the customer, replaced with a manometer. In exemplary embodiments, the pressure indicator devices are screwed or inserted into the socket of the flat tire repair kit.

The pressure indicator device preferably has a size that is adapted so that the pressure indicator device does not protrude from the outer dimensions of the flat tire repair kit. It is thus possible to avoid or at least reduce an injury risk for the user as well as a susceptibility of the pressure indicator device to fail.

The adjustability of the reference pressure ranges by means of the throttle permits the pressure indicator device for flat tire repair kits to be used for different vehicles from a wide variety of manufacturers.

BRIEF DESCRIPTION OF THE DRAWINGS

Other advantages, features, and details of the invention ensue from the following description of preferred exemplary embodiments and from the drawings; in the drawings.

DETAILED DESCRIPTION OF THE INVENTION

FIGS. 1 through 4 show a first exemplary embodiment of a pressure indicator device 1.1 according to the invention for a flat tire repair kit for motor vehicles. The pressure indicator device 1.1 provides the user with an indication of a pressure prevailing in a tire that is being filled, which pressure is produced by a compressor of the flat tire repair kit and is conveyed via a pressure outlet into the tire that is being filled.

In addition to a base body, the pressure indicator device 1.1 according to the invention includes a conduit 4.1, an optical element, an acoustic element, and a throttle 5.1. In a typical exemplary embodiment, the throttle 5.1 includes an adjustable throttle valve.

Figure 4:
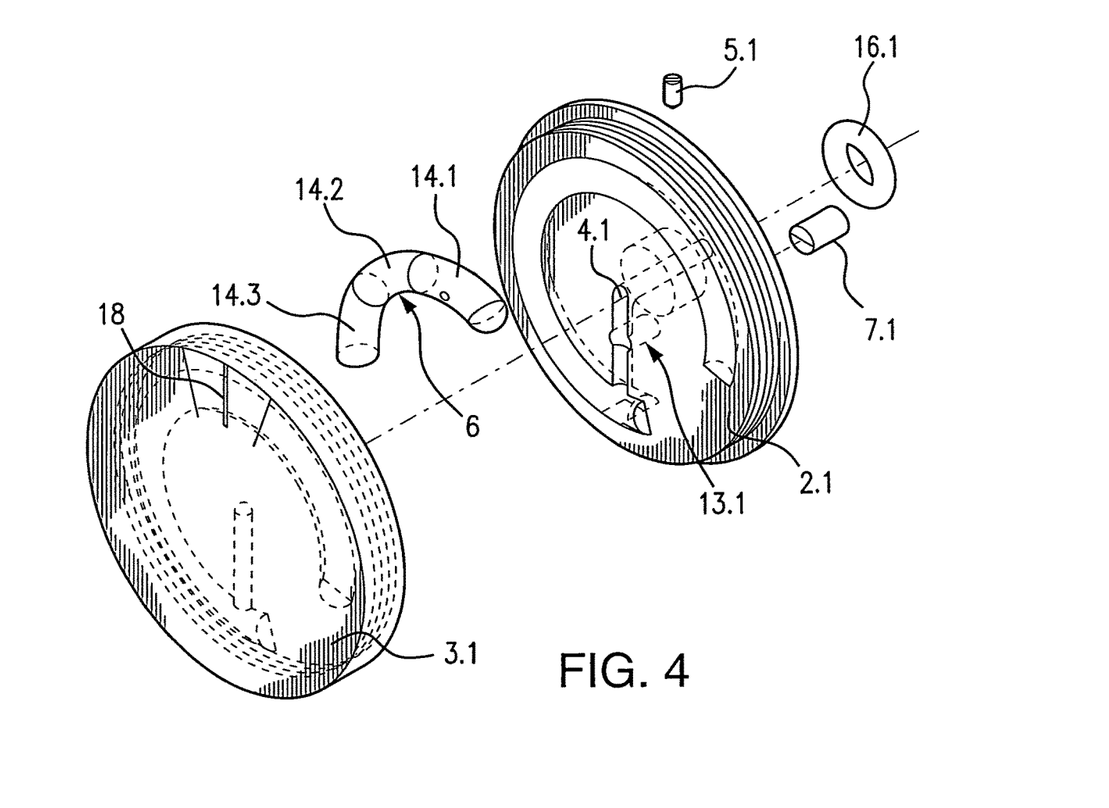
FIG. 4 shows an exploded depiction of the pressure indicator device according to FIG. 1.
Figure 5:
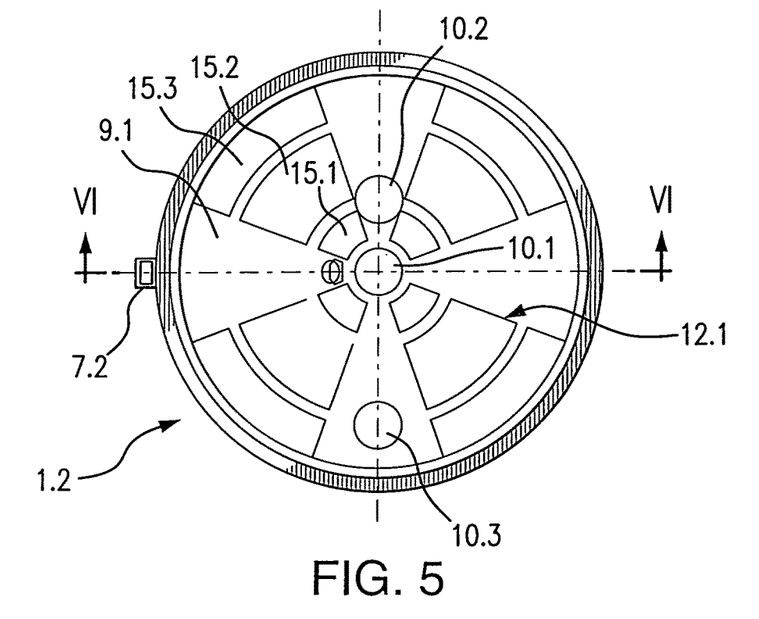
FIG. 5 shows a top view of a second exemplary embodiment of a pressure indicator device according to the invention.
Figure 6:
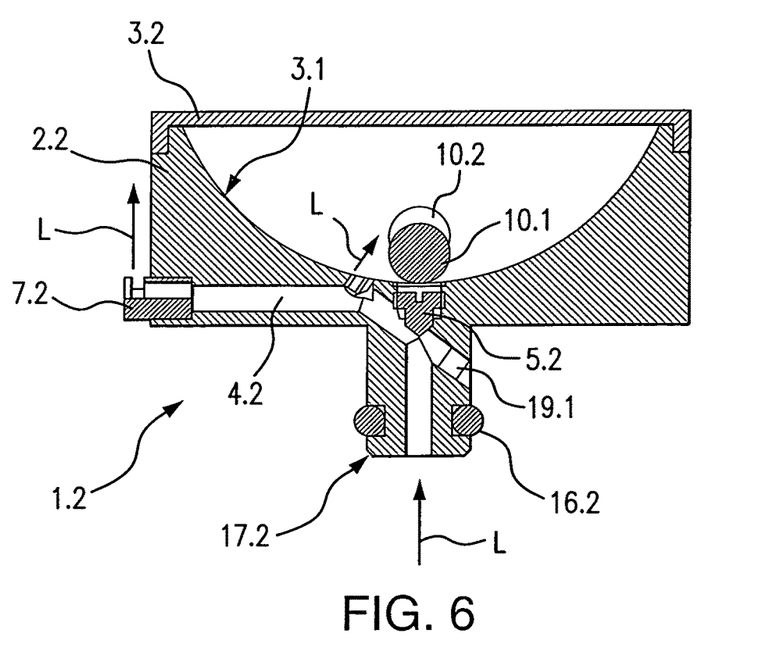
FIG. 6 shows a sectional depiction along the line VI-VI through the pressure indicator device according to FIG. 5.
Figure 7:
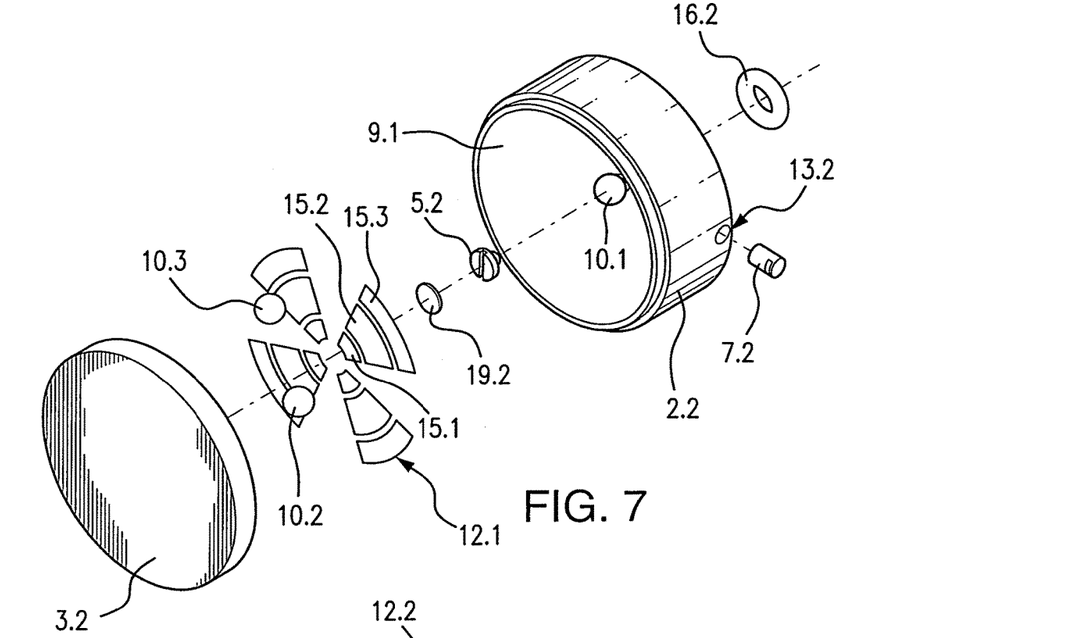
FIG. 7 shows an exploded depiction of the pressure indicator device according to FIG. 5.
Figure 8:
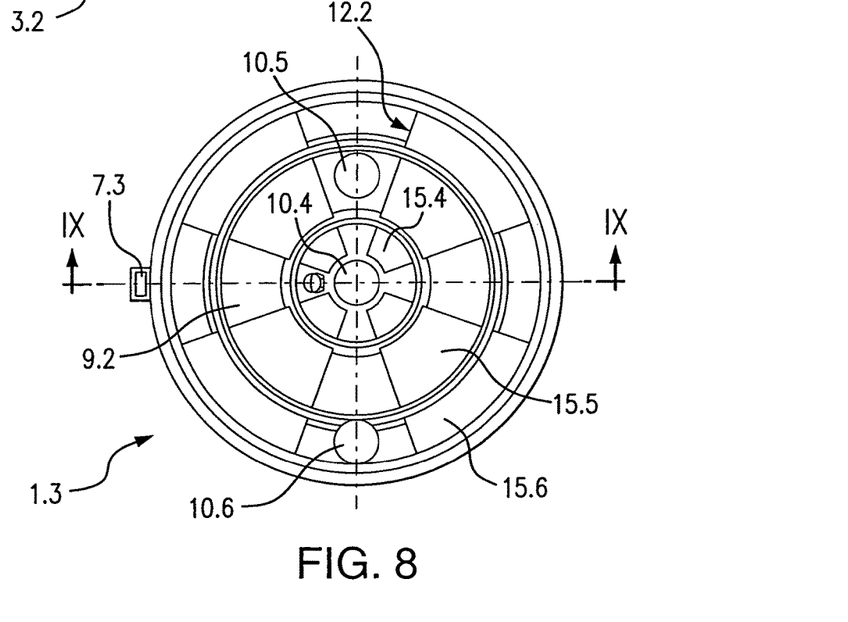
FIG. 8 shows a top view of another exemplary embodiment of a pressure indicator device according to the invention.
Figure 9:
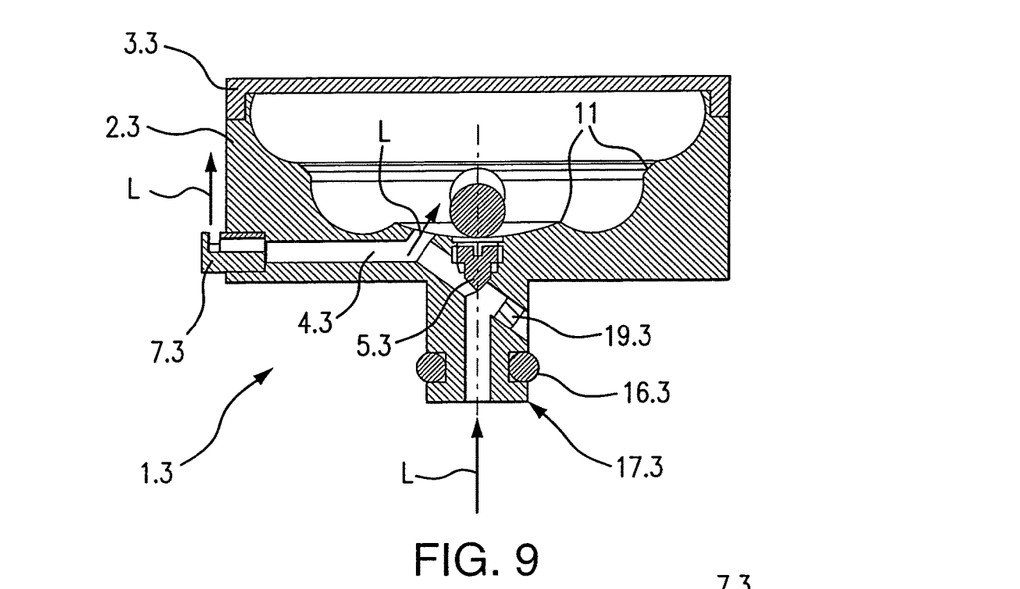
FIG. 9 shows a sectional depiction along the line IX-IX through the pressure indicator device according to FIG. 8.
Figure 10:
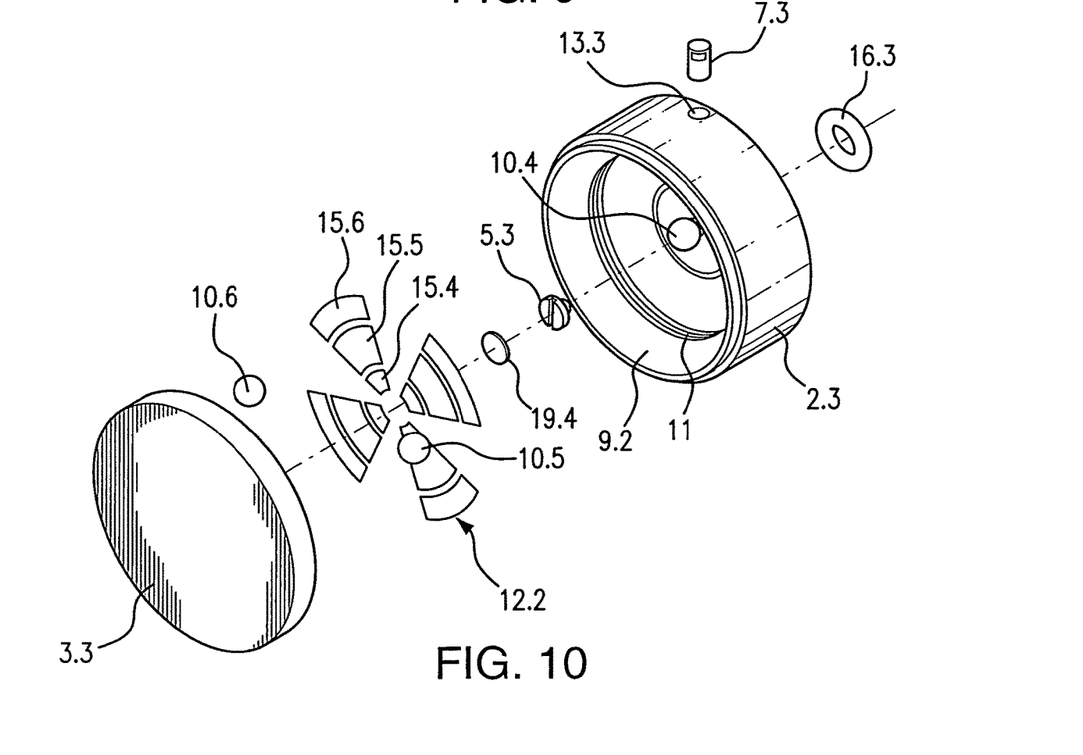
FIG. 10 shows an exploded depiction of the pressure indicator device according to FIG. 8.

As an optical element, the pressure indicator device 1.1 has an indicator element in the form of a slider 6. The slider 6 of the pressure indicator device 1.1 also includes a color scale, which is composed of a plurality of indicator regions 14.1 through 14.3 and is mounted on the slider 6 or integrated into the slider 6. The indicator regions 14.1 through 14.3 correspond to regions of the color scale that depict reference pressure ranges. The color scale is preferably divided into three indicator regions 14.1 through 14.3. In FIG. 4, a measuring scale 18 is mounted onto a base body cover 3.1.

In an exemplary embodiment, the indicator region 14.1 is assigned the color green, the indicator region 14.2 is assigned the color yellow, and the indicator region 14.3 is assigned the color red. The green color of indicator region 14.1 notifies a user that the air pressure in the tire that is being filled has reached a value that a manufacturer of the vehicle considers to be optimal. Through the possibility of depicting a reference pressure range as optimal, it is possible to take into account differences in the optimal tire pressure for different tire sizes that are approved for the vehicle. The yellow color of indicator region 14.2 can notify the user that the optimal reference pressure range has been slightly exceeded. It is thus possible, for example, to take into account the recommendation to fill winter tires with approximately 0.2 bar more pressure. The red color of indicator region 14.3 notifies the user that the pressure in the tire is too high. In this case, the user is thus notified that he should allow some air to escape from the tire via a pressure outlet of the flat tire repair kit.

As an acoustic element, the pressure indicator device 1.1 includes a sound generator with a resonance chamber. Preferably, the sound generator with the resonance chamber is an acoustic whistle 7.1.

In order to connect the pressure indicator device 1.1 to the flat tire repair kit, the pressure indicator device 1.1 has a connector 17.1 with a seal, for example an O-ring 16.1. In a typical exemplary embodiment, the connector 17.1 corresponds to a pressure indicator socket on the flat tire repair kit, which is preferably also suitable for use as the socket for a normal manometer. It is thus possible, depending on the customer's wishes, to equip the flat tire repair kit with a manometer or a pressure indicator device 1.1.

Figure 1:
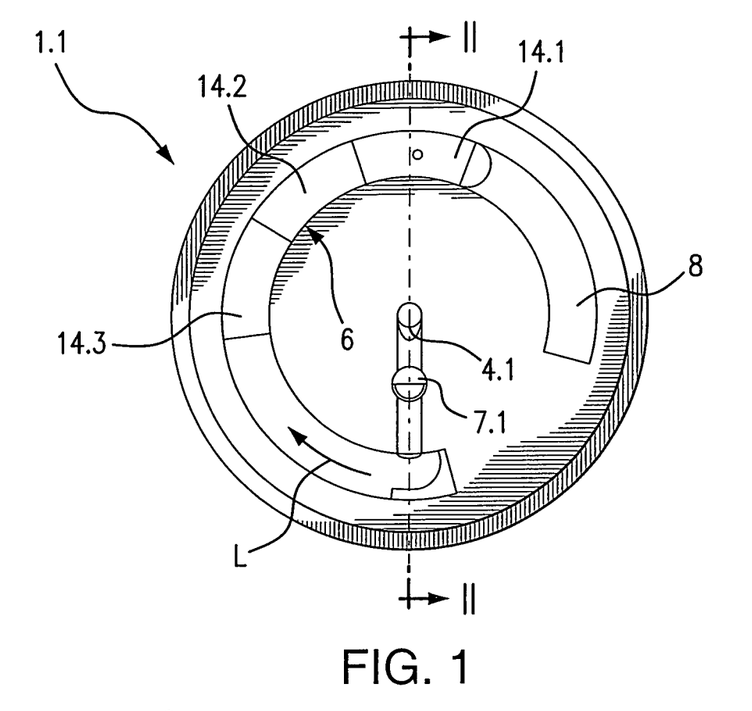
FIG. 1 is a top view of a first exemplary embodiment of a pressure indicator device according to the invention.
Figure 2:
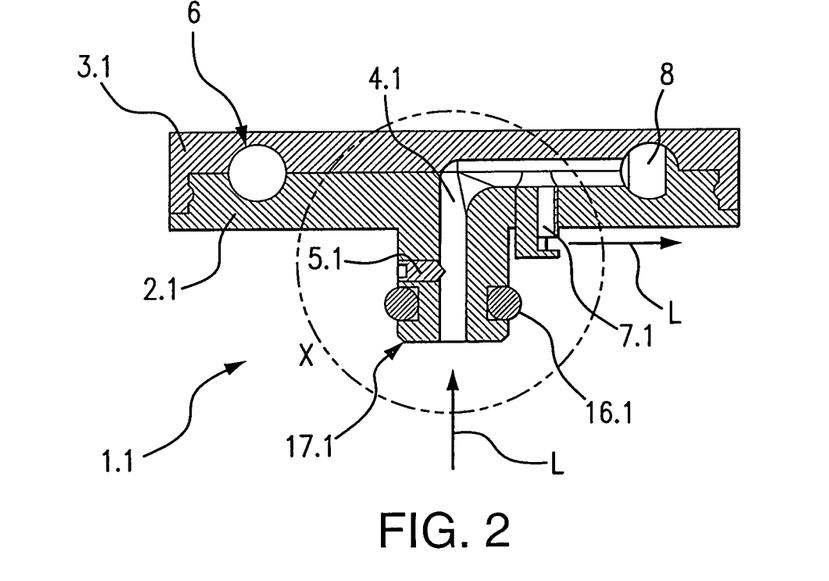
FIG. 2 is a sectional depiction along the line II-II by the pressure indicator device according to FIG. 2.
Figure 3:
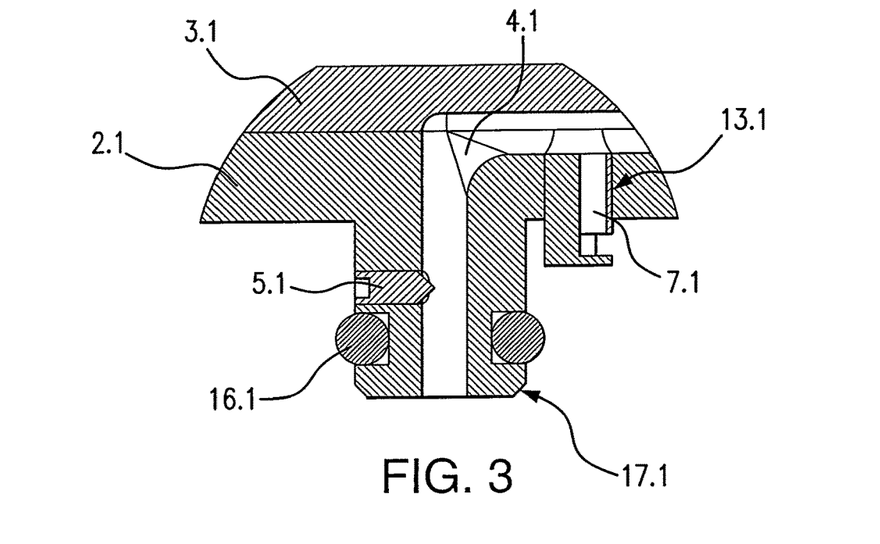
FIG. 3 shows an enlarged depiction of the detail X from FIG. 3.

The optical element and the acoustic element of the pressure indicator device 1.1 are operationally connected to the conduit 4.1. In addition, as shown in FIGS. 2 and 3, an air flow L produced by the air pressure of the compressor in the base body of the pressure indicator device 1.1 is deflected by the conduit 4.1 into a horizontal direction. The term "horizontal" is used to mean a plane and/or direction that is essentially parallel to the ground, in particular to a road surface. It can, however, also extend at an inclined angle. The deflection of the air flow L into the horizontal direction makes it possible for the pressure indicator device 1.1 to be accommodated within the outer dimensions of the flat tire repair kit and as a result, it does not protrude from an outer envelope of the flat tire repair kit.

The conduit 4.1 of the pressure indicator device 1.1 is partially accommodated in a base body bottom part 2.1 of the base body. Another part of the conduit 4.1 is formed by recesses in the base body bottom part 2.1 and a base body cover 3.1 once the two parts are assembled. The conduit 4.1 of the pressure indicator device 1.1 conveys the air flow L at least partially into a tube 8. The slider 6 is supported so that it is able to move in the tube 8, particularly in a sliding fashion.

In addition, the base body, preferably the base body bottom part 2.1 shown in FIGS. 3 and 4, has a socket 13.1 for the acoustic element. The socket 13.1 is operationally connected to the conduit 4.1. In a typical exemplary embodiment, the acoustic element, in particular the acoustic whistle 7.1, is adapted to the reference pressure ranges that are indicated by the indicator regions 14.1 through 14.3. Depending on the customer's wishes, the acoustic signal of the acoustic whistle 7.1 can begin to emit a signal, for example when the optimal reference pressure range is reached, or for example only once the optimal reference pressure range is exceeded.

FIGS. 5 through 7 and FIGS. 8 through 10 respectively show another exemplary embodiment of a pressure indicator device 1.2 and 1.3 according to the invention. In the pressure indicator devices 1.2 and 1.3, the air flow L through the conduit 4.2 or 4.3 is deflected into a horizontal direction and an inclined horizontal direction.

The conduit 4.2 or 4.3 likewise has a socket 13.2 or 13.3 for an acoustic element and is operationally connected to the acoustic element. In a typical exemplary embodiment, the acoustic element in the pressure indicator device 1.2 or 1.3 is an acoustic whistle 7.2 or 7.3. The reference pressure ranges shown by the pressure indicator device 1.2 or 1.3 can be adjusted by means of a throttle 5.2 or 5.3.

In a typical exemplary embodiment, the indicator element of the pressure indicator device 1.2 or 1.3 that provides the user with an indication of a reference pressure range is a ball 10.1 through 10.3 or 10.4 through 10.6. The pressure indicator device 1.2 or 1.3 has a ball as an indicator element. Preferably, a ball that is white in color is used. As a color scale, the pressure indicator device 1.2 or 1.3 includes a color scale film 12.1 or 12.2, which is glued to the base body cover 3.2 or 3.3. The color scale film 12.1 or 12.2 preferably has three indicator regions 15.1 through 15.3 or 15.4 through 15.6. The indicator regions 15.1 through 15.3 or 15.4 through 15.6 of the color scale film 12.1 or 12.2 show the user the reference pressure ranges. In another exemplary embodiment that is not shown, the color scale is integrated into the base body cover.

For the sake of simplicity in FIGS. 5 through 7 and 8 through 10, the balls 10.1 through 10.3 and 10.4 through 10.6 are respectively shown in the same figure for the different indicator regions 15.1 through 15.3 or 15.4 through 15.6. The ball is accommodated in a parabolic funnel 9.1 or a parabolic funnel 9.2 with steps 11 in the base body bottom part 2.2 or 2.3. The funnel 9.1 or 9.2 forms a cavity with the base body cover 3.2 or 3.3. The air flow L is blown into this cavity in an inclined horizontal direction through the conduit 4.2 or 4.3. Depending on the intensity of the air flow L blowing in, the ball 10.1 through 10.3 or 10.4 through 10.6 is moved in a horizontal and/or inclined horizontal direction and thus provides the user with an indication of a reference pressure range.

In the exemplary embodiments of the pressure indicator device 1.2 or 1.3 shown, the indicator region 15.1 or 15.4 is assigned a white color, the indicator region 15.2 or 15.5 is assigned a green color, and the indicator region 15.3 or 15.6 is assigned a red color. The indicator region 15.1 or 15.4 can be used to indicate to the user that the pressure in the tire that is being filled is too low, the indicator region 15.2 or 15.5 can be used to indicate that the pressure in the tire that is being filled is in an optimal reference pressure range, and the indicator region 15.3 or 15.6 can be used to indicate that the pressure in the tire that is being filled is too high.

By means of the color scale film 12.1 or 12.2, whose colored indicator regions 15.1 through 15.3 and 15.4 through 15.6 have a transparency, the ball in the respective indicator regions 15.1 through 15.3 and 15.4 through 15.6, from the point of view of the user, has the colors indicated by the color scale 12.1 or 12.2. In the depicted exemplary embodiments of the pressure indicator device 1.2 or 1.3, the ball 10.1 or 10.4 that is situated in the indicator region 15.1 or 15.4 appears to the user to be white, the ball 10.2 or 10.5 that is situated in the indicator region 15.2 or 15.5 appears to be green, and the ball 10.3 or 10.6 that is situated in the indicator region 15.3 or 15.6 appears to be red.

The reference pressure ranges to be indicated by means of the indicator regions 15.1 through 15.3 and 15.4 through 15.6 can be adjusted via the throttle 5.2 or 5.3. In order to cover the throttle 5.2 or 5.3 and unneeded openings of the conduit 4.2 or 4.3, cover elements such as stoppers 19.1 through 19.4 are used.

The present invention functions as follows and will be described in conjunction with the pressure indicator devices 1.1 and 1.2:

In order to indicate the air pressure in a tire that is being filled, the pressure indicator device 1.1 or 1.2 is operationally connected to the pressure outlet of the flat tire repair kit. For this purpose, the flat tire repair kit has a socket for the pressure indicator device 1.1 or 1.2, which socket corresponds to the connector 17.2 or 17.2 of the pressure indicator device 1.1 or 1.2. This enables the pressure indicator device 1.1 or 1.2 to be easily replaced and allows it to be used for various flat tire repair kits.

If the user uses the flat tire repair kit to increase the air pressure in the tire that is being filled, then the air flow L via the conduit 4.1 or 4.2 is deflected into a horizontal and/or an inclined horizontal direction. The deflected air flow L causes the indicator element in the form of the slider 6 or ball 10.1 to start to move. The air pressure is increased to produce an increasingly powerful air flow L. The indicator region 14.1 of the slider 6 or the indicator region 15.2 in connection with the ball 10.2 notifies the user once an optimal reference pressure range has been achieved in the tire that is being filled. In addition, in one exemplary embodiment, once the optimal reference pressure range is reached, the acoustic whistle 7.1 or 7.2 begins to emit a sound. The acoustic whistle 7.1 or 7.2 in this case preferably emits a whistling sound that exceeds the volume of the compressor of the flat tire repair kit. The acoustic signal and the optical indication provide the user with a simple indication of when the optimal reference pressure range is reached, without the user having to pay attention, for example, to a thin needle of a manometer. This is a considerable advantage, particularly when a flat tire occurs in the dark.

As soon as the pressure in the tire that is being filled exceeds the optimal reference pressure range, the pressure indicator device 1.1 or 1.2 indicates this to the user by means of the slider 6 or ball 10.3 reaching the next indicator region 14.2 or 15.3. Depending on the exemplary embodiment, the user can, by means of a red color of indicator region 15.3, be immediately notified that an excessive pressure is present in the tire that is being filled or the user can, by means of a yellow color of indicator region 14.2, be notified that a slightly excessive pressure is prevailing in the tire that is being filled. In the second case, if the air pressure in the tire subsequently increases further, then the user, by means of the red color of indicator region 14.3, is notified that the pressure in the tire has reached an excessively high value.

The invention claimed is:

1. A pressure indicator device for a flat tire repair kit for motor vehicles in which the flat tire repair kit includes a compressor and a pressure outlet; the pressure indicator device (1.1-1.3) comprising:
    an indicator for a pressure that the compressor of the flat tire repair kit produces in a tire that is being filled;
    a base body, a conduit (4.1-4.3), an optical element, an acoustic element, and a throttle (5.1-5.3), wherein the acoustic element includes a sound generator with a resonance chamber;
    an adjustable throttle valve of the throttle (5.1-5.3), wherein the conduit (4.1-4.3) is operationally connected to the optical element and the acoustic element;
    an air flow (L) through the conduit (4.1-4.3) that the air pressure produces in the base body is deflected into a horizontal and/or an inclined horizontal direction, wherein the throttle valve adjusts the air flow through the conduit (4.1-4.3) to the optical element and the acoustic element; and
    an indicator element of the optical element moveable in the horizontal and/or inclined horizontal direction.

2. The pressure indicator device for a flat tire repair kit for motor vehicles according to claim 1, wherein the optical element includes the indicator element and a color scale, with regions of the color scale representing reference pressure ranges.

3. The pressure indicator device for a flat tire repair kit for motor vehicles according to claim 2, wherein the color scale is mounted onto and/or integrated into the slider (6) or a base body cover (3.1-3.3).

4. The pressure indicator device for a flat tire repair kit for motor vehicles according to claim 2, wherein the color scale is divided into preferably three indicator regions (14.1-14.3, 15.1-15.6).

5. The pressure indicator device for a flat tire repair kit for motor vehicles according to claim 1, wherein the indicator element is a ball (10.1-10.6) or a slider (6).

6. The pressure indicator device for a flat tire repair kit for motor vehicles according to claim 1, wherein the sound generator comprises an acoustic whistle (7.1-7.3).

7. The pressure indicator device for a flat tire repair kit for motor vehicles according to claim 1 wherein the pressure indicator device is replaceable.

8. A pressure indicator device for a flat tire repair kit for motor vehicles in which the flat tire repair kit includes a compressor and a pressure outlet; the pressure indicator device (1.1-1.3) comprising:
    an indicator for a pressure that the compressor of the flat tire repair kit produces in a tire that is being filled;
    a base body, a conduit (4.1-4.3), an optical element, an acoustic element, and a throttle (5.1-5.3), wherein the base body includes a socket (13.1-13.3) for the acoustic element, wherein the socket (13.1-13.3) for the acoustic element is operationally connected to the conduit (4.1-4.3);
    an adjustable throttle valve of the throttle (5.1-5.3), wherein the conduit (4.1-4.3) is operationally connected to the optical element and the acoustic element;
    an air flow (L) through the conduit (4.1-4.3) that the air pressure produces in the base body is deflected into a horizontal and/or an inclined horizontal direction, wherein the throttle valve adjusts the air flow through the conduit (4.1-4.3) to the optical element and the acoustic element; and
    an indicator element of the optical element moveable in the horizontal and/or inclined horizontal direction.

9. The pressure indicator device for a flat tire repair kit for motor vehicles according to claim 8, wherein the acoustic element includes a sound generator with a resonance chamber.

10. A pressure indicator device for a flat tire repair kit for motor vehicles in which the flat tire repair kit includes a compressor and a pressure outlet, the pressure indicator device comprising:
   a base body;
   an indicator element comprising an optical element;
   a conduit extending through the base body to the optical element, wherein the conduit is configured to deliver an air flow to the optical element;
   a throttle disposed in the base body and including an adjustable throttle valve, wherein the throttle valve adjusts the air flow through the conduit to the optical element, wherein a reference pressure range shown by the indicator element is adjustable by the throttle.

11. The pressure indicator device for a flat tire repair kit for motor vehicles according to claim 10, wherein the conduit deflects the air flow into a horizontal or an inclined horizontal direction to deliver the air flow to the optical element.

12. The pressure indicator device for a flat tire repair kit for motor vehicles according to claim 10, further comprising an acoustic element connected to the conduit.

13. A pressure indicator device for a flat tire repair kit for motor vehicles in which the flat tire repair kit includes a compressor and a pressure outlet, the pressure indicator device comprising:
   a base body;
   an indicator element comprising an optical element;
   a conduit extending through the base body to the optical element, wherein the conduit is configured to deliver an air flow to the optical element;
   a throttle disposed in the base body and including an adjustable throttle valve, wherein the throttle valve adjusts the air flow through the conduit to the optical element; and
   an acoustic element connected to the conduit, wherein the acoustic element is connected to the air flow between the throttle and the optical element.

14. A pressure indicator device for a flat tire repair kit for motor vehicles in which the flat tire repair kit includes a compressor and a pressure outlet, the pressure indicator device comprising:
   a base body;
   an indicator element comprising an optical element, wherein the optical element comprises a ball within a funnel-shaped cavity formed in the base body;
   a conduit extending through the base body to the optical element, wherein the conduit is configured to deliver an air flow to the optical element;
   a throttle disposed in the base body and including an adjustable throttle valve, wherein the throttle valve adjusts the air flow through the conduit to the optical element.

15. The pressure indicator device for a flat tire repair kit for motor vehicles according to claim 14, wherein the cavity comprises a parabolic funnel.

16. The pressure indicator device for a flat tire repair kit for motor vehicles according to claim 15, wherein the cavity comprises two circular steps formed from the base body.

17. The pressure indicator device for a flat tire repair kit for motor vehicles according to claim 15, wherein a reference pressure range shown by the indicator element is adjustable by the throttle.

18. A pressure indicator device for a flat tire repair kit for motor vehicles in which the flat tire repair kit includes a compressor and a pressure outlet, the pressure indicator device comprising:
   a base body;
   an indicator element comprising an optical element;
   a conduit extending through the base body to the optical element, wherein the optical element comprises a slide within a tube connected to the conduit and the conduit is configured to deliver an air flow to the optical element;
   a throttle disposed in the base body and including an adjustable throttle valve, wherein the throttle valve adjusts the air flow through the conduit to the optical element.

19. The pressure indicator device for a flat tire repair kit for motor vehicles according to claim 18, wherein each of the tube and the slide are curved and move along a circular path.

20. The pressure indicator device for a flat tire repair kit for motor vehicles according to claim 18, wherein the slide comprises at least two indicator regions including two different colors.

* * * * *